United States Patent [19]

Schaffner et al.

[11] Patent Number: 5,278,260
[45] Date of Patent: Jan. 11, 1994

[54] PROCESS FOR THE PREPARATION OF EPOXY RESINS WITH CONCURRENT ADDITION OF GLYCIDOL AND EPIHALOHYDRIN

[75] Inventors: Werner Schaffner; Dimiter Hadjistamov, both of Riehen, Switzerland

[73] Assignee: Ciba-Geigy Corporation, Ardsley, N.Y.

[21] Appl. No.: 959,863

[22] Filed: Oct. 13, 1992

Related U.S. Application Data

[63] Continuation-in-part of Ser. No. 938,564, Aug. 28, 1992, abandoned, which is a continuation of Ser. No. 682,051, Apr. 8, 1991, abandoned.

[30] Foreign Application Priority Data

Apr. 12, 1990 [CH] Switzerland ............... 1282/90

[51] Int. Cl.$^5$ ............... C08G 65/28; C08G 59/06
[52] U.S. Cl. ............... 525/507; 528/88; 528/89; 528/90; 528/91; 528/92; 528/93; 528/94; 528/95; 549/517
[58] Field of Search ............... 549/517; 528/88, 89, 528/90, 91, 92, 93, 94, 95; 525/507

[56] References Cited

U.S. PATENT DOCUMENTS

| | | | |
|---|---|---|---|
| 2,558,949 | 9/1945 | Greenlee | 528/87 |
| 4,215,210 | 7/1980 | Okayama et al. | 528/93 |
| 4,465,722 | 8/1984 | Fiaux et al. | 528/94 |

OTHER PUBLICATIONS

H. Lee & K. Neville, Handbook of Epoxy Resins, 1982, Resins 5–39.

*Primary Examiner*—Frederick Krass
*Attorney, Agent, or Firm*—JoAnn Villamizar; Luther A. R. Hall

[57] ABSTRACT

A process for the preparation of epoxy resins having a specific reproducible content of α-glycol groups, which process comprises adding at least 0.0085 mol of glycidol or glycidol precursor compound per hydroxy-equivalent of a phenolic compound A which contains 2, 3 or 4 phenolic hydroxyl groups during the reaction of said phenolic compound A with an epihalohydrin which is unsubstituted or substituted in 2- or 3-position by $C_1$-$C_4$alkyl. The products may be used for surface protection.

11 Claims, No Drawings

PROCESS FOR THE PREPARATION OF EPOXY RESINS WITH CONCURRENT ADDITION OF GLYCIDOL AND EPIHALOHYDRIN

RELATED APPLICATIONS

This application is a continuation-in-part of application Ser. No. 938,564, filed Aug. 28, 1992, now abandoned, which is a continuation of application Ser. No. 682,051, filed Apr. 8, 1991 now abandoned.

The present invention relates to a process for the preparation of epoxy resins having a defined content of α-glycol groups.

Epoxy resins containing α-glycol units are known. Thus, for example, EP-A 99 334 discloses a process for the preparation of such epoxy resins having a high content of α-glycol groups by subjecting an already prepared epoxy resin to an aftertreatment with polyhdric phenols and glycidol. A further method of preparing epoxy resins which contain α-glycol groups comprises subjecting epoxy resins to partial hydrolysis to form a diol from the epoxy group (q.v. Lee & Neville, "Handbook of Epoxy Resins", McGraw-Hill, New York, 1982, 5-39). The drawback of these methods is, first, that epoxy resins must be prepared as starting materials and, second, that it is only possible to control with difficulty the α-glycol content of the final products.

Surprisingly, a process has now been found which does not have these shortcomings and which leads to products having a defined content of α-glycol groups, i.e. to epoxy resins having a specific reproducible content of glycol groups which can be controlled by the process of the invention. The epoxy resins obtained can be liquid as well as solid products.

The present invention relates to a process for the preparation of epoxy resins having a specific reproducible content of α-glycol groups, which process comprises adding at least 0.0085 mol of glycidol or glycidol precursor compound per hydroxy-equivalent of a phenolic compound A which contains 2, 3 or 4 phenolic hydroxyl groups during the reaction of said phenolic compound A with an epihalohydrin which is unsubstituted or substituted in 2- or 3-position by $C_1$-$C_4$alkyl.

All phenols which are conventionally used for the preparation of epoxy resins are suitable for use as phenolic compounds A which contain 2 to 4 phenolic hydroxyl groups.

Illustrative examples of such phenols are: diphenols (such as resorcinol) or triphenols (phloroglucinol), which may also be substituted; naphthalenes containing 2, 3 or 4 hydroxyl groups, such as 1,4-dihydroxynaphthalene; biphenyls and other binuclear aromatic compounds which contain methylene, isopropylidene, O—, SO₂—, S— or NR-bridges (R=H or lower alkyl or phenyl) and 2 to 4 hydroxyl groups attached to the aromatic nuclei, such as preferably bisphenol A, bisphenol F or bisphenol S, wherein the benzene nuclei may also contain halogen atoms, for example tetrabromobisphenol A. Further compounds are novolaks derived from phenols or cresols.

Compound A is preferably a dihydric phenol, and is most preferably bisphenol A.

Suitable epichlorohydrins which are unsubstituted or substituted by $C_1$-$C_4$alkyl in 2- or 3-position are typically epichlorohydrin, epibromohydrin, epiiodohydrin, or the epichlorohydrins which are substituted by $C_1$-$C_4$alkyl in 2- or 3-position, for example 2-methylepichlorohydrin.

It is preferred to use epichlorohydrin or 2-methylepichlorohydrin. Epichlorohydrin is especially preferred.

The reaction can be carried out in the presence or absence of a catalyst. It is preferred to use a catalyst.

Suitable catalysts are: the nucleophilic catalysts disclosed in FR-A-2 063 025, such as imidazoles, benzimidazoles, imidazolines, dihydropyrimidines tetrahydropyrimidines, dihydroquinazolines, more particularly methylimidazole or phenylimidazole, preferably 2-phenylimidazole.

Suitable catalysts may also be alkali metal hydroxides and alkaline earth metal hydroxides, preferably sodium hydroxide, as well as alkali metal alcoholates and alkaline earth metal alcoholates of formula $X^{n\oplus}(OR^{\ominus})_n$, wherein X is the alkali metal ion or alkaline earth metal ion, R is $C_1$-$C_{12}$alkyl, preferably $C_1$-$C_4$alkyl, and n has the valency of the alkali metal ion or alkaline earth metal ion. Sodium methylate is especially preferred. It is also possible to use as catalysts in the process of this invention quarternary ammoniums salts, preferably hydroxides or halides of formula

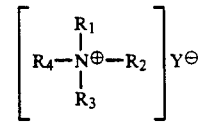

wherein $R_1$, $R_2$ and $R_3$ are each independently of one another unsubstituted or OH-substituted alkyl of 1 to 16 carbon atoms, and $R_4$ is alkyl of 1 to 16 carbon atoms, phenyl or benzyl, and Y is hydroxyl or halogen. Such catalysts are disclosed, for example, in GB-B-1 364 804. It is preferred to use tetralkylammonium salts, most preferably tetramethylammonium salts. Finally, it is also possible to use as catalysts phosphonium halides of formula

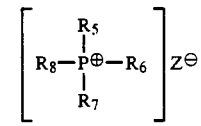

wherein Z is halogen, such as chloro, bromo or iodo, and $R_5$, $R_6$, $R_7$ and $R_8$ are each independently of one another monovalent hydrocarbon groups, $R_5$, $R_6$ and $R_7$ are preferably alkyl, cycloalkyl, aryl, alkaryl and arylalkyl, each containing not more than 25, preferably up to 18, carbon atoms, such as phenyl, butyl, octyl, lauryl, hexadecyl or cyclohexyl. $R_8$ is preferably an alkyl group of 1 to 10, most preferably 1 to 4, carbon atoms, such as methyl, ethyl, propyl, n-butyl, sec-butyl and n-decyl. Illustrative examples of phosphonium halide catalysts are methyltriphenylphosphonium iodide, ethyltriphenylphosphonium iodide, propyltriphenylphosphonium iodide, n-butyltriphenylphosphonium iodide, n-decyltriphenylphosphonium iodide, ethyltributylphosphonium iodide, ethyltriphenylphosphonium chloride and ethyltriphenylphosphonium bromide. $C_1$-$C_4$Alkyltriphenylphosphonium iodides are especially preferred. Such catalysts are disclosed, for example, in GB-B-1 204 760. Suitable catalysts are also phosphorus compounds which are described in the following patent specifications: U.S. Pat. Nos.

3,547,881, 4,048,141, 4,132,706, GB 1 398 197 and GB 1 485 345.

The most preferred catalyst is 2-phenylimidazole.

The amount of catalyst used may vary within a wide range and is preferably from 0.0001 to 10% by weight, more particularly from 0.0002 to 5% by weight, more particularly still from 0.0005 to 1% by weight and, most preferably, from 0.005 to 1% by weight, based on the total weight of the educts present in the reaction mixture.

The reaction can be carried out without a solvent or in a solvent, a mixture of solvents or a mixture of solvent and water, 5–95% solutions of the reactants being preferred.

Suitable solvents are typically toluene, xylene, methyl ethyl ketone, methyl isobutyl ketone, butyl acetate, dioxane, isopropanol or 2-ethoxyethanol, preferably isopropanol. Epichlorohydrin may preferably be used as solvent.

The reaction temperatures are normally in the range from 20° to 200° C., preferably from 40° to 120° C.

If a catalyst is used, it must be added slowly so as to avoid too sharp a rise in the temperature of the exotherming reaction mixture. It is preferred to carry out the reaction under nitrogen. The reaction time is normally from one hour to several hours.

Glycidol can also be added in the form of other compounds which form glycidol under the prevailing reaction conditions, for example 3-chloro-1,2-propanediol, 2-chloro-1,3-propanediol, 3-bromo-1,2-propanediol or 2-bromo-1,3-propanediol. It is preferred to use glycidol in the form of 3-chloro-1,2-propanediol.

It must be borne in mind that glycidol is reacted in about stoichiometric amount, whereas, for example, 3-chloro-1,2-propanediol is reacted in only about half the stoichiometric amount. Therefore if 3-chloro-1,2-propanediol is used as glycidol forming compound, the minimum amount is twice the stoichiometric amount, i.e. 0.017 mol per hydroxy-equivalent of the phenolic compound A.

The products prepared by the process of this invention contain a defined content of α-glycol groups. This content depends on the amount of glycidol or 3-chloro-1,2-propanediol used. Regard must be had to the fact that, in the reaction of a phenolic compound A with an epihalohydrin, as described by N. S. Enikolopyan et al. in J. Polym. Sci., Chem. Ed. 20, (1982) pp. 1231–1245, irrespective of an addition of glycidol, a certain content of α-glycol groups is always present in the resultant product, for example from ca. 0.1 to ca. 0.2 equivalent/kg, which content may, however, vary. The addition of glycidol results in a higher desired content of α-glycol groups. However, the process of this invention enables this higher content to be predetermined, i.e. defined.

Preferred epoxy resins prepared by the process of this invention have a content of α-glycol groups of at least 0.2 equivalent/kg, but those having a content of more than 0.3 equivalent/kg are especially preferred.

The products prepared by the process of this invention can be cured by crosslinking with conventional hardners for epoxy resins, for example polycarboxylic anhydrides, polyamines or polyhydric phenols, to give final products having good flexibility.

The products can be used for surface protection, for making castings, especially in the electrical field, and prepregs and laminates. They can also be used in the field of photopolymerisation and as solder and insulating varnishes.

EXAMPLE 1

228 g of bisphenol A and 610 g of epichlorohydrin are charged to a 1.5 liter reactor with bottom outlet. Then 17.5 g of 3-chloro-1,2-propanediol, 130 g of isopropanol and 25 g of water are added in succession. The temperature is raised to 68° C. and the reaction mass is stirred at 450 rpm. Under a gentle stream of nitrogen, 12 g of 50% aqueous NaOH are added over 10 minutes and the batch is allowed to react for 5 minutes. Then 12.5 g of 50% aqueous NaOH are added over 30 minutes, followed by the addition of 25 g of 50% aqueous NaOH over the next 15 minutes. Immediately afterwards, 90 g of aqueous 50% NaOH are added at 69° C. over 15 minutes. After the addition, the reaction mixture is stirred for 5 minutes and then 292 g of cold water are added, stirring is continued for 5 minutes, and the batch is allowed to stand for phase separation. After 15–30 minutes, ca. 500 g of brine solution are drawn off from the bottom of the reactor. To the organic phase in the reactor are added 34.6 g of 50% aqueous NaOH over 10 minutes at 450 rpm and the batch is stirred at 69° C. for 5 minutes. The batch is then cooled to a temperature below 45° C. and 104 g of water are added. After stirring for 5 minutes, the batch is allowed to stand for phase separation. About 160 g of brine solution are drawn off from the bottom of the reactor after 15 minutes. The organic phase is dried to constant weight in a round flask on a rotary evaporator under vacuum at 130° C. The epichlorohydrin-isopropanol distillate can be reused for the next reaction after analysis.

The resin residue is almost 100% of theory, based on bisphenol A. The resin is filtered hot in a filter press (ex Seitz, Switzerland) over a filter having a pore size Supra 200.

The epoxy value is 5.28 equivalents/kg. The amount saponifiable chlorine is 0.11%, and of α-glycol groups 0.36 equivalent/kg. The viscosity at 25° C. is 11 300 mPas.

What is claimed is:

1. A process for the preparation of epoxy resins having a specific reproducible content of α-glycol groups in the presence of a catalyst, which process comprises adding at least 0.0085 mol of glycidol or at least 0.017 mol of glycidol precursor compound per hydroxy-equivalent of a phenolic compound A which contains 2, 3, or 4 phenolic hydroxy groups during the reaction of said phenolic compound A with an epihalohydrin which is unsubstituted or substituted in 2- or 3-position by $C_1-C_4$alkyl.

2. A process according to claim 1, wherein glycidol is added in the form of 3-chloro-1,2-propanediol, using at least 0.017 mol of 3-chloro-1,2-propanediol per hydroxy-equivalent of phenol compound A.

3. A process according to claim 1, wherein the reaction is carried out in the temperature range from 20° to 200° C.

4. A process according to claim 1, wherein the reaction is carried out in the temperature range from 40° to 120° C.

5. A process according to claim 1, wherein the reaction is carried out with the addition of a solvent.

6. A process according to claim 1, wherein the reaction is carried out in the presence of a nucleophilic catalyst.

7. A process according to claim 6, wherein the catalyst is selected from the group consisting of sodium hydroxide, sodium methylate, a quaternary phosphonium salt and an ammonium salt.

8. A process according to claim 6, wherein the catalyst is 2-phenylimidazole.

9. A process according to claim 1, wherein compound A is a dihydric phenol.

10. A process according to claim 9, which comprises reacting bisphenol A with epichlorohydrin and glycidol.

11. A process according to claim 9, which comprises reacting bisphenol A with epichlorohydrin and glycidol in the form of 3-chloro-1,2-propanediol.

* * * * *